US011002545B2

(12) United States Patent
Strandjord et al.

(10) Patent No.: US 11,002,545 B2
(45) Date of Patent: May 11, 2021

(54) SIDEBAND HETERODYNE SWITCHING FOR RESONATOR FIBER OPTIC GYROSCOPES (RFOGS)

(71) Applicant: Honeywell International Inc., Morris Plains, NJ (US)

(72) Inventors: Lee K. Strandjord, Tonka Bay, MN (US); Glen A. Sanders, Scottsdale, AZ (US); Jianfeng Wu, Tucson, AZ (US); Tiequn Qiu, Glendale, AZ (US); Marc Smiciklas, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 73 days.

(21) Appl. No.: 16/546,115

(22) Filed: Aug. 20, 2019

(65) Prior Publication Data

US 2021/0055108 A1 Feb. 25, 2021

(51) Int. Cl.
*G01C 19/72* (2006.01)
(52) U.S. Cl.
CPC ......... *G01C 19/723* (2013.01); *G01C 19/721* (2013.01); *G01C 19/727* (2013.01)
(58) Field of Classification Search
CPC ... G01C 19/723; G01C 19/727; G01C 19/721
See application file for complete search history.

(56) References Cited

U.S. PATENT DOCUMENTS

| 4,836,676 A | 6/1989 | Kim et al. |
| 8,947,671 B2 | 2/2015 | Strandjord et al. |
| 9,115,994 B2 | 8/2015 | Strandjord et al. |
| 9,121,708 B1 | 9/2015 | Qiu |
| 9,772,189 B2 | 9/2017 | Strandjord et al. |
| 10,746,550 B2 * | 8/2020 | Strandjord ............ H03D 7/165 |
| 2011/0141477 A1 | 6/2011 | Sanders et al. |
| 2014/0240712 A1 | 8/2014 | Strandjord et al. |

OTHER PUBLICATIONS

European Patent Office, "Extended European Search Report from EP Application No. 20180633.8", from Foreign Counterpart to U.S. Appl. No. 16/546,115, dated Nov. 17, 2020, pp. 1 through 9, Published: EP.

* cited by examiner

*Primary Examiner* — Hwa Andrew Lee
(74) *Attorney, Agent, or Firm* — Fogg & Powers LLC (57) ABSTRACT

Systems and methods for performing SHD switching for RFOGS are provided herein. A system includes a resonator in which light resonates; at least one laser source that produces first and second optical beams; heterodyne modulators that modulate the first and second optical beams at a heterodyne frequency plus a modulation frequency offset to produce multiple sideband optical beams, wherein the modulation frequency offset has a different sign for the first and second optical beams; a frequency switching controller that alternatingly switches the signs of the modulation frequency offset applied to the first and second optical beams, wherein the heterodyne modulation of the first and second optical beams are on average at the heterodyne frequency; at least one coupler that couples the sideband optical beams into the resonator; a feedback control that detects the sideband optical beams transmitted from the resonator and, in response, adjusts frequencies of the optical beams.

20 Claims, 5 Drawing Sheets

SIDEBAND HETERODYNE SWITCHING FOR RESONATOR FIBER OPTIC GYROSCOPES (RFOGS)

STATEMENT REGARDING FEDERALLY SPONSORED RESEARCH OR DEVELOPMENT

This invention was made with Government support under Ordnance Technology Base Agreement No. 2016-316, Ordnance Agreement No. 1 awarded by NTA INC PO NTA-CR-DOTC2016316-02. The Government has certain rights in the invention. This material is based upon work supported by the DOTC.

BACKGROUND

The resonator fiber optic gyroscope (RFOG) may potentially provide high rotation sensing performance within a small volume at low cost. The RFOG may use at least two laser beams, where at least one laser beam propagates around a resonator coil in the clockwise (CW) direction and at least one other laser beam propagates in the counterclockwise (CCW) direction. In meeting gyroscope performance requirements, the center frequency of the CW and CCW resonances may be measured at a high degree of precision. In some implementations, the RFOGs may use phase or frequency modulation of the CW and CCW laser frequencies and demodulation of the resonator output to precisely detect the resonance center frequency.

In operation, RFOGs may have at least two types of gyroscope bias errors. These bias errors include modulation imperfections and optical backscatter. Further, some solutions that resolve the modulation imperfection errors may exacerbate the optical backscatter errors and vice versa. For example, modulation imperfection errors may be suppressed by using common modulation for both the CW and CCW propagating laser beams. Conversely, optical backscatter errors may be suppressed by using separated modulation at different frequencies for the CW and CCW propagating laser beams. Sideband heterodyne detection (SHD) is a method that uses common modulation along with SHD modulation at a very high-frequency to suppress both modulation imperfection errors and optical backscatter errors.

SUMMARY

Systems and methods for performing sideband heterodyne switching for resonator fiber optic gyroscopes are provided herein. In certain embodiments, a system includes a resonator configured to allow light to resonate therein. Additionally, the system may include at least one laser source configured to produce a plurality of optical beams, the plurality of optical beams comprising a first optical beam and a second optical beam. Further, the system includes a plurality of heterodyne modulators that perform heterodyne modulation of the first optical beam and the second optical beam at a heterodyne frequency plus a modulation frequency offset to produce a plurality of sideband optical beams at a plurality of sideband frequencies, wherein the modulation frequency offset has a different sign for the first optical beam and the second optical beam. Also, the system includes a frequency switching controller that performs sideband heterodyne switching that alternatingly switches the signs of the modulation frequency offset applied to the first optical beam and the second optical beam, wherein the heterodyne modulation of the first optical beam and the second optical beam are on average substantially at the heterodyne frequency during a period of time. Moreover, the system includes at least one coupler configured to couple the plurality of sideband optical beams into the resonator. Further, the system includes a feedback control coupled to the resonator that detects the plurality of sideband optical beams transmitted out of the resonator and adjust frequencies of the plurality of optical beams based on the detected plurality of sideband optical beams.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Systems and methods for performing sideband heterodyne switching for RFOGs are provided herein. As stated above sideband heterodyne detection may be used to suppress both modulation imperfections and optical backscatter errors. However, in order to suppress backscatter errors, the CW and CCW SHD modulation frequencies may be separated. The frequency separation may lead to some residual errors due to SHD modulation imperfections, which may increase significantly when low-cost silicon photonics (SiP) chips are used for the laser source and to provide the SHD modulation.

In certain embodiments, to suppress the residual errors due to SHD modulation imperfections, the SHD modulation frequencies may be further modulated such that the CW and CCW SHD frequencies are mostly different at any one time, but on average, over time, are at the proper frequency. By switching the SHD modulation frequencies in this way, the CW and CCW SHD modulation frequencies are never the same, and therefore, optical backscatter errors are suppressed, but the SHD modulation frequencies averaged over time are at or very near to the SHD proper frequencies and therefore, SHD modulation imperfections may also be suppressed.

Figure 1:
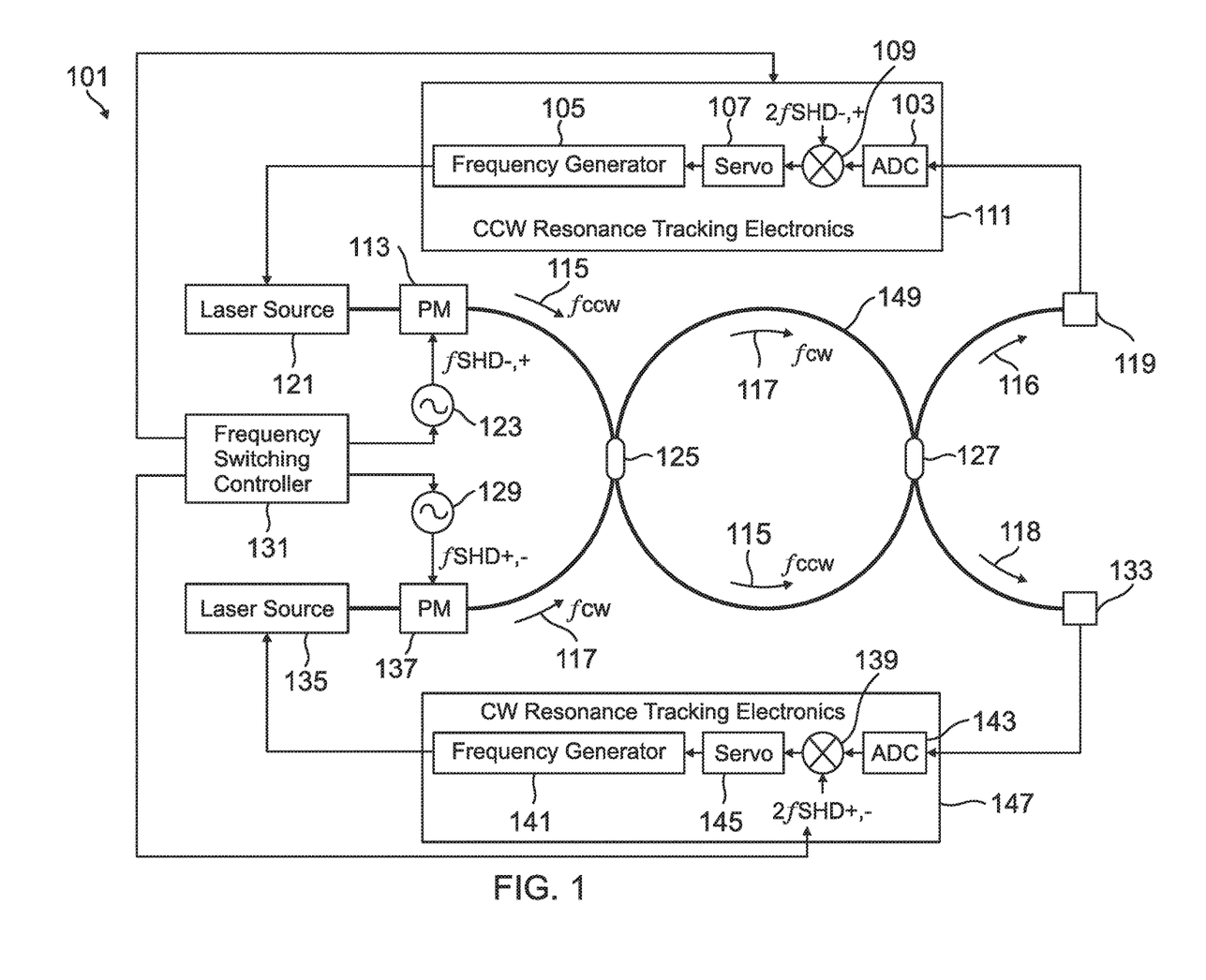
FIG. 1 is a block diagram illustrating an exemplary resonator fiber optic gyroscope that employs sideband heterodyne switching according to an aspect of the present disclosure.

FIG. 1 is a block diagram illustrating an exemplary RFOG 101 that employs sideband heterodyne switching according to at least one embodiment of the present disclosure. The RFOG 101 may include a first laser source 121 and a second laser source 135 that are both coupled to a fiber optic resonator 149 by at least one optical coupler 125. The RFOG 101 may also include CCW resonance tracking electronics 111, CW resonance tracking electronics 147, and frequency switching controller 131, each of which are discussed in greater detail below.

As shown in FIG. 1, a laser source 121 outputs a first optical beam 115 that is coupled into the resonator 149 by the coupler 125 in a first direction. For the example of FIG. 1, the first optical beam 115 is defined as traveling around the resonator 149 in a counterclockwise (CCW) direction. A laser source 135 may output a second optical beam 117 of laser light that is coupled into the resonator 149 by the coupler 125 and travels around the resonator 149 in a second direction that is opposite to the first direction traveled by the optical beam 115. For the example of FIG. 1, the second optical beam 117 is defined as traveling around the resonator 149 in a clockwise (CW) direction. While the first optical beam 115 is described as traveling in the CCW direction and the second optical beam 117 is described as traveling in the CW direction, the first optical beam 115 may propagate through the resonator 149 in any direction that is opposite to the propagation direction of the second optical beam 117.

In certain embodiments, the first laser source 121 and the second laser source 135 may each be controlled by respective feedback control, such as the resonance tracking electronics (shown at 111 and 147) to maintain the frequencies of the first optical beam 115 and the second optical beam 117 at resonance frequencies for the resonator 149. For example, the first laser source 121 may launch the optical beam 115 into the resonator 149 at a specific optical frequency (shown in FIG. 1 as fccw). At that frequency, fccw, the optical beam 115 may exhibit a specific wavelength, λccw, in the resonator (which for laser light may be a wavelength on the order of 1.5 microns, for example). When the optical beam 115 is tuned to a frequency fccw such that the resonator 149 length equals to exactly an integer multiple of wavelengths λccw, then the first optical beam 115 may be operating at a resonant frequency of the resonator 149 (which may also be referred to as one of the resonant modes of the resonator 149). At this resonant frequency, with each pass that the first optical beam 115 travels around the loop of the resonator 149, the first optical beam 115 is in phase with the previous passes of the first optical beam 115 around the resonator 149. Accordingly, the optical power of the first optical beam 115 from each pass through the resonator 149 accumulates to a peak resonant intensity. As the frequency fccw deviates from the resonant frequency, the optical power within the resonator 149 that is associated with the first optical beam 115 may sum to less than the peak resonant intensity.

In a similar manner, the second laser source 135 may launch the second optical beam 117 into the resonator 149 at a specific optical frequency (shown in FIG. 1 as fcw). At that frequency, fcw, the second optical beam 117 may exhibit a specific wavelength, λcw. When the second optical beam 117 is tuned to a frequency fcw such that exactly an integer multiple of wavelengths λcw are propagating around the resonator 149, then the second optical beam 117 may be operating at a resonant frequency of the resonator 149 (which may also be referred to as one of the resonant modes of the resonator 149). At this resonant frequency, with each pass that the first optical beam 117 travels around the loop of the resonator 149, the first optical beam 117 may be in phase with the previous passes of the first optical beam 115 around the resonator 149. Accordingly, the optical power of the first optical beam 115 from each pass through the resonator 149 accumulates to a peak resonant intensity. As the frequency fccw deviates from the resonant frequency, the optical power within the resonator 149 that is associated with the first optical beam 115 may sum to less than the peak resonant intensity.

With embodiments of the present disclosure, the first laser source 121 and the second laser source 135 may be controlled by the corresponding resonance tracking electronics 111 and 147 to remain locked to different resonance modes with respect to each other. That is, if the first optical beam 115 is locked to a first resonant frequency (where an integer number, I, of wavelengths are propagating in the CCW direction around the resonator 149), then the second optical beam 117 may be locked to a second resonant frequency (where an integer number, J, where J≠I, of wavelengths are propagating in the CW direction around the resonator 149). The frequencies of beam 115 and beam 117 may be separated from each other based on a function of the free spectral range (FSR) of the resonator 149. As such, when the first resonant frequency is less than the second resonant frequency by exactly one free spectral range, then the second optical beam 117 may be said to be operating at the next higher resonant mode than the first optical beam 115, and the first optical beam 115 may be said to be operating at the next lower resonant mode than the second optical beam 117.

In certain embodiments, the first optical beam 115 may be driven to a frequency fccw that is substantially equal to the first resonant frequency that corresponds to a first resonant mode. Additionally, the second optical beam 117 may be driven to a frequency fcw that is substantially equal to the second resonant frequency that corresponds to a second resonant mode. Accordingly, the frequency difference between the peak resonant intensity at the first resonant mode and the peak resonant intensity at the second resonant mode may be equal to the free spectral range. In examples discussed within this disclosure, the first laser source 121 and the second laser source 135 may operate at adjacent resonant modes that are separated by one free spectral range. However, it should be appreciated that additional embodiments may be conceived that are within the scope of the present disclosure where the first laser source 121 and the second laser source 135 produce optical beams separated by other integer multiples of the free spectral range.

As mentioned above, the frequency fccw of the first optical beam 121 may be locked to a resonant frequency by the CCW resonance tracking electronics 111. Similarly, the frequency fcw of the second optical beam 135 may be locked to a resonant frequency by the CW resonance tracking electronics 147. In some embodiments, the locking of the optical beams 121 and 135 by associated resonance tracking electronics 111 and 147 may be performed by operating the resonance tracking electronics 111 and 147 as frequency locked loops. More specifically, the CCW optical beam 115 may be frequency or phase modulated to interrogate the resonator. A portion of the CCW propagating optical beam 115 may be coupled out of the resonator 149 by an optical coupler 127 and delivered to a first photodetector 119, where the first photodetector 119 measures the transmitted optical intensity of the first output optical beam 116. From this measurement, the photodetector 119 may produce a resonance tracking signal, which is an electrical signal that varies as a function of the measured optical intensity.

In certain embodiments, when the carrier/center optical frequency of the first optical beam 115 is on resonance, the output of the photodetector 119 may not have a frequency component at the modulation frequency. The photodetector output at the modulation frequency may be proportional to small average optical frequency deviations from the resonance frequency. Deviations from the first resonance frequency may produce a tracking error at the modulation frequency in the resonance tracking signal produced by the photodetector 119. The CCW resonance tracking electronics 111 may receive the resonance tracking signal from the photodetector 119 at the modulation frequency and may provide a control signal to the laser source 121 that adjust the frequency fccw of the first optical beam 115 to drive the tracking error at the modulation frequency to zero (i.e., the control signal provided by the CCW resonance tracking electronics 111 may drive the optical beam 115 to the desired resonance frequency).

In similar embodiments, a portion of the CW propagating optical beam 117 may be coupled out of the resonator 149 by the optical coupler 127 and delivered to a second photodetector 133, which may measure the transmitted optical intensity of the second output optical beam 118. From this measurement, the photodetector 133 may produce a second resonance tracking signal, which is an electrical signal that varies as a function of the measured optical intensity. When the carrier/center optical frequency of the CW beam 117 is on resonance the output of the photodetector 133 may not have a frequency component at the modulation frequency. The photodetector output at the modulation frequency may be proportional to small average optical frequency deviations from the resonance frequency. Deviations from the second resonance frequency may produce a tracking error at the modulation frequency reflected in the second resonance tracking signal. The CW resonance tracking electronics 147 may receive the second resonance tracking signal and provide a second control signal to the second laser source 135 and adjust the frequency fcw of the second optical beam 117 to drive the tracking error at the modulation frequency (i.e., the control signal provided by the CW resonance tracking electronics 147 may drive the optical beam 117 to the desired resonance frequency).

In some implementations, when locking the propagating optical beams within the RFOG 101 to resonant frequencies, the RFOG 101 may experience different types of bias errors. For example, the RFOG 101 may experience modulation imperfections and optical backscatter. These errors may be suppressed using different techniques. For example, the modulation imperfections may be suppressed using common modulation and the optical backscatter errors may be suppressed separated modulation at different frequencies for the optical beams propagating in different directions within the resonator 149.

In several embodiments, common modulation may be used to suppress modulation imperfections. While systems for providing common modulation are not shown in FIG. 1, common modulation of the optical frequency or phase of each optical beam may be used to provide an error signal that indicates when the optical frequency of a beam has deviated away from a resonance for a resonator 149. Common modulation may produce a resonator output signal at the photodetectors 119 and 133. The resonator output signal may have a component at the modulation frequency that may be used as an error signal to detect when the corresponding laser beam is on resonance. The amplitude of the error signal at the modulation frequency will be zero when the frequency of the optical beam is on resonance. If the frequency of the optical beam deviates from resonance, the amplitude of the error signal will be non-zero and will have a sign that depends on the direction of deviation from resonance. The error signal at the modulation frequency may be demodulated down to DC by mixing with a reference signal at the modulation frequency. The DC error signal may then be used by a servo to control the frequency of the optical beam.

However, because the resonance detection modulation frequency is common for all the optical beams, a method may be employed to distinguish the error signal associated with each field. To distinguish the resonance detection error signals of each field the RFOG 101 may include multiple phase modulators, such as a first phase modulator 113 and a second phase modulator 137. The first phase modulator 113 and the second phase modulator 137 may modulate the first optical beam 115 and the second optical beam 117 at different modulation frequencies such that each optical beam has corresponding sidebands at different locations in the frequency spectrum.

In some embodiments, the frequencies of the phase modulations may be referred to as the sideband heterodyne frequencies the phase modulators 113 and 137 may be referred to as heterodyne modulators 113 and 137. In some implementations, the heterodyne modulation frequencies are high and equal to an half-integer (n+½) of the free spectral range. The frequency of the optical beams may be tuned to either place the carrier and even sidebands on resonance, or the frequencies of the optical beams may be tuned to place the odd sidebands on resonance. When the odd sidebands are placed on resonance, the carrier and even sideband of the optical beams will be off resonance.

In certain embodiments, the first optical beam 115 produced by the first laser source 121 and the second optical beam 117 produced by the second laser source 135 may be respectively modulated by a first heterodyne modulator 113 and a second heterodyne modulator 137. The first heterodyne modulator 113 and the second heterodyne modulator 137 modulate the first optical beam 115 and the second optical beam 117 by sideband heterodyne frequencies. For example, the first heterodyne modulator 113 may modulate the first optical beam 115 by a first heterodyne frequency 123 that is represented by $f_{SHD-,+}$. The second heterodyne modulator 137 may modulate the second optical beam 115 by a second heterodyne frequency 129 that is represented by $f_{SHD+,-}$.

In some embodiments, the first heterodyne frequency 123 and the second heterodyne frequency 129 may be set to be substantially equal to odd multiples of half of the free spectral range of the resonator 149. When the first optical beam 115 and the second optical beam 117 are modulated at the first heterodyne frequency 123 and the second heterodyne frequency 129, the resonance tracking electronics 111 and 147 may tune a carrier frequency for the first optical beam 115 and the second optical beam 117 to a frequency in the middle of two adjacent resonant modes of the resonator 149. Accordingly, the modulation of the first optical beam 115 and the second optical beam 117 may produce sideband signals, where the first harmonic sidebands are located on resonant peaks of the resonator 149.

In certain embodiments, when the first optical beam 115 and the second optical beam 117 are modulated at the first heterodyne frequency 123 and a second heterodyne frequency 129, the sideband signals produced by the modulation may propagate around the resonator 149 in opposite directions. For example, the sidebands of the first optical beam 115 may be coupled into the resonator 149 through the coupler 125. The sidebands of the first optical beam 115 may then propagate around the resonator 149 in the CCW direction. In a similar fashion, the sidebands of the second optical beam 117 may also be coupled into the resonator 149 through the coupler 125. The sidebands of the second optical beam 117 may then propagate around the resonator 149 in the CW direction.

In some embodiments, when the sideband signals of the second optical beam 117, propagating in the CW direction, are received by the coupler 127, a portion of the sideband signals of the second optical beam 117 are coupled out of the resonator 149 and received by the photodetector 133. The photodetector 133 may detect the optical beat note generated by the interference between the sideband signals and may pass an electrical signal representing the beat note between the first sideband signals to the CW resonance tracking electronics 147.

Similarly, when the sideband signals of the first optical beam 115, propagating in the counterclockwise direction, are received by the coupler 127, a portion of the sideband signals of the first optical beam 115 may be coupled out of the resonator 149 and received by the photodetector 119. The photodetector 119 may detect the optical beat note generated by the interference between the sideband signals and may pass an electrical signal representing the beat note between the first sideband signals to the CCW resonance tracking electronics 111.

In certain embodiments, the first photodetector 119 and the second photodetector 133 respectively provide electrical signals to the CCW resonance tracking electronics 111 and the CW resonance tracking electronics 147. As described herein, the CCW resonance tracking electronics 111 and the CW resonance tracking electronics 147 function substantially similar to one another. As shown, the CCW resonance tracking electronics 111 include an analog-to-digital converter (ADC) 103. As described herein, the ADC 103 may receive the analog electrical signal provided by the first photodetector 119 and convert the analog signal to a digital signal.

In some embodiments, the CCW resonance tracking electronics 111 may include a demodulator 109 coupled to the ADC 103 to receive and demodulate the digital signal produced by the ADC 103. The demodulator 109 demodulates the digital signal at a received demodulation frequency. In some embodiments, the demodulation frequency is two times the first heterodyne frequency 123. For example, since the frequency separation between the first sideband signals, received at the photodetector 119, are at twice the (SHD) modulation frequency 123, the beat note between the first sidebands will be at twice the first heterodyne frequency 123.

In further embodiments, where the first optical beam 115 was commonly modulated, the signal produced by the demodulator 109 may be demodulated by an additional common demodulator (not shown in FIG. 1 but illustrated as common demodulator 451 in FIG. 4), where the common demodulator demodulates the signal produced by the demodulator 109 at the common modulation frequency.

In certain embodiments, the demodulated signal may be provided to a servo 107. As described herein, the servo 107 functions to lock the frequency of the carrier of the first optical beam 115 produced by the first laser source 121 to either a resonance frequency or in the middle of two adjacent resonances of the resonator 149. For example, the servo 107 may track the error (i.e., deviation from the resonance frequency) in the signal received by the servo 107 and based on the error in the signal, the servo 107 may provide an output signal to a frequency generator 105. The output signal may control adjustments made by the frequency generator 105 to the frequency of the first optical beam 115 such that the sidebands of the first optical beam 115 produced by the first laser source 121 are at the resonant frequency for the resonator 149. As used herein, the frequency generator 105 may provide the signal to the first laser source 121 that instructs the first laser source 121 as to the frequency of the first optical beam 115 produced by the first laser source 121. Accordingly, the CCW resonance tracking electronics 111 are able to determine departures of the first optical beam 115 from resonant frequencies of the resonator 149 and provide a signal to the first laser source 121 to adjust the frequency of the first optical beam 115. Based on the control signal received from the servo 107, the frequency generator 105 may provide a signal to the first laser source 121. Also, the servo 107 may provide a measurement of the deviation from the resonant frequency to a processor, where the processor may determine rotation rates based on the deviation from the resonant frequency. In some implementations, the processor may aid the servo 107 in calculating deviations from the resonant frequencies for the resonator 149.

As described above, the CW resonance tracking electronics 147 function similarly to the CCW resonance tracking electronics 111. Thus, the CW resonance tracking electronics 147 include an analog-to-digital converter (ADC) 143, where the ADC 143 may receive the analog electrical signal provided by the second photodetector 133 and convert the analog signal to a digital signal.

In some embodiments, the CW resonance tracking electronics 147 may include a demodulator 139 coupled to the ADC 143 to receive and demodulate the digital signal produced by the ADC 143. The demodulator 139 demodulates the digital signal at a received demodulation frequency. In some embodiments, the demodulation frequency is two times the second heterodyne frequency 129. For example, since the frequency separation between the first sideband signals, received at the second photodetector 133, are at twice the second heterodyne frequency 129, the beat note between the first sidebands will be at twice the second heterodyne frequency 129.

In further embodiments, where the second optical beam 117 was commonly modulated, the signal produced by the demodulator 139 may be demodulated by an additional common demodulator (not shown in FIG. 1 but illustrated as common demodulator 423 in FIG. 4), where the common demodulator demodulates the signal produced by the demodulator 139 at the common modulation frequency, which is the same common modulation frequency used to demodulate the signal produced by the demodulator 109 in the CCW resonance tracking electronics 111.

In certain embodiments, the demodulated signal may be provided to a servo 145. As described herein, the servo 145 functions to lock the frequency of the second optical beam 117 produced by the second laser source 135 to a resonance frequency of the resonator 149. For example, the servo 145 may track the error (i.e., deviation from the resonance frequency) in the signal received by the servo 145 and based on the error in the signal, the servo 145 may provide an output signal to a frequency generator 141. The output signal may control adjustments made by the frequency generator 141 to the frequency of the second optical beam 117 such that the sidebands of the second optical beam 117 produced by the second laser source 135 are at the resonant frequency for the resonator 149. As used herein, the frequency generator 141 may provide the signal to the second laser source 135 that instructs the second laser source 135 as to the frequency of the second optical beam 117 produced by the second laser source 135. Accordingly, the CW resonance tracking electronics 147 can determine departures of the second optical beam 117 from resonant frequencies of the resonator 149 and provide a signal to the second laser source 135 to adjust the frequency of the second optical beam 117. Based on the control signal received from the servo 145, the frequency generator 141 may provide a signal to the second laser source 135. Also, the servo 145 may provide a measurement of the deviation from the resonant frequencies to a processor, where the processor may determine rotation rates based on the deviation from the resonant frequencies. In some implementations, the processor may aid the servo 145 in calculating deviations from the resonant frequencies for the resonator 149.

As described above, modulation imperfection errors may be suppressed using common modulation for both the first optical beam 115 and the second optical beam 117. Additionally, optical backscatter errors may be suppressed by using separated modulation at different frequencies (sideband heterodyne frequencies) for the first optical beam 115 and the second optical beam 117. To suppress the backscatter errors, the first sideband heterodyne frequency 123 and the second sideband heterodyne frequency 129 may be separated in frequency. However, this frequency separation may lead to some residual errors due to sideband heterodyne modulation imperfections. In particular, the residual errors increase significantly when low-cost silicon photonics (SiP) chips are used for the first laser source 121, the second laser source 135, and the performance of the sideband heterodyne modulation. Accordingly, systems described herein may further suppress errors from sideband heterodyne modulation imperfections, which may facilitate the use of low cost SiP modulators for performing the sideband heterodyne modulation.

The amplitude of rotation sensing errors from sideband heterodyne modulation imperfections may be proportional to the sideband heterodyne modulation frequency deviation from the proper sideband heterodyne frequency. As described above, the proper sideband heterodyne frequency may occur when the sideband heterodyne modulation frequency is at an odd integer of half the free spectral range for the resonator 149. Thus, sideband heterodyne modulation imperfection errors go to zero when the sideband heterodyne modulation frequency is at the proper frequency. However, if both the CW and CCW sideband heterodyne frequencies are set at the proper frequency, then optical backscatter errors may become very large.

In certain embodiments, to reduce optical backscatter errors that arise from the CW and CCW sideband heterodyne frequencies being both set to the proper sideband heterodyne modulation frequency, the first sideband heterodyne frequency 123 and the second sideband heterodyne frequency 129 are shifted by an offset frequency such that the first sideband heterodyne frequency 123 and the second sideband heterodyne frequency 129 are mostly different at any one time, but on average over time are at the proper heterodyne frequency.

In some embodiments, the first sideband heterodyne (SHD) frequency 123 ($f_{SHD-,+}$) and the second SHD frequency 129 ($f_{SHD+,-}$) may be modulated using square-wave frequency modulation, sinusoidal frequency modulation, or other type of frequency modulation. When square-wave frequency modulation is used to modulate the first SHD frequency 123 and the second SHD frequency 129, the modulation frequencies of the first SHD frequency 123 and the second SHD frequency 129 may be periodically switched. For example, during a first half of a switching cycle, the first SHD frequency 123, $f_{SHD-,+}$, may be slightly below the proper heterodyne frequency and the second SHD frequency 129 $f_{SHD+,-}$ may be slightly above the proper heterodyne frequency by the same amount as the first SHD frequency 123 is below the proper heterodyne frequency. During the second half of the switching cycle, the first SHD frequency 123, $f_{SHD-,+}$, may be switched to be slightly above the proper heterodyne frequency and the second SHD frequency 129 $f_{SHD+,-}$ may be switched to be slightly below the proper heterodyne frequency by the same amount that the first SHD frequency 123 is above the proper heterodyne frequency. By switching the first SHD frequency 123 and the second SHD frequency 129 as described above, the first SHD frequency 123 and the second SHD frequency 129 are rarely equal to one another. Thus, optical backscatter errors that arise from both the first SHD frequency 123 and the second SHD frequency 129 simultaneously being at the heterodyne frequency are suppressed. Additionally, by switching the first SHD frequency 123 and a second SHD frequency 129 as described above, both the averages of the first SHD frequency 123 and the second SHD frequency 129 are substantially at or very near the heterodyne frequency over a period of time. Thus, SHD modulation imperfections are also suppressed.

In certain embodiments, the RFOG 101 may include a frequency switching controller 131. As described herein, the frequency switching controller 131 may control the sideband heterodyne switching of the first SHD frequency 123 and the second SHD frequency 129. In certain embodiments, the frequency switching controller 131 may include digital components, such as a processor that executes instructions to control the modulation of the first SHD frequency 123 and the second SHD frequency 129. In alternative embodiments, the frequency switching controller 131 may include analog components that periodically switch the modulation frequencies of the first SHD frequency 123 and the second SHD frequency 129.

In various embodiments, the frequency switching controller 131 may provide square-wave modulation of the first SHD frequency 123 and the second SHD frequency 129. For example, the first SHD frequency 123 and the second SHD frequency 129 may each be equal to 3 MHz when the FSR is 2 MHz and the SHD frequency is 1.5 times the FSR. The frequency switching controller 131 may modulate the first SHD frequency 123 and the second SHD frequency 129 by a frequency having a magnitude of 100 Hz but opposite signs for the first SHD frequency 123 and the second SHD frequency 129. The frequency switching controller 131 may modulate the sideband heterodyne frequencies such that the first SHD frequency 123 and the second SHD frequency 129 modulate the respective first optical beam 115 and the second optical beam 117 at different frequencies most of the time but at the same frequency on average over time. For instance, during the first half of a modulation frequency cycle, the frequency switching controller 131 may modulate the first SHD frequency 123 such that the first SHD frequency 123 is 100 Hz less than the proper heterodyne frequency. Also, the frequency switching controller 131 may modulate the second SHD frequency 129 such that second SHD frequency 129 is 100 Hz more than the proper heterodyne frequency.

During the transition from the first to the second half of the modulation frequency cycle, the frequency switching controller 131 may switch the modulation of the first heterodyne frequency 123 and the second heterodyne frequency 129. Thus, during the second half of the modulation cycle, the frequency switching controller 131 may modulate the first SHD frequency 123 such that the first SHD frequency 123 is 100 Hz above the proper frequency. Also, the frequency switching controller 131 may modulate the second SHD frequency 129 such that the second SHD frequency 129 is 100 Hz below the proper frequency. Accordingly, the first SHD frequency 123 and the second SHD frequency 129 are at different frequencies most of the time but on average are at the same frequency.

In certain embodiments, in addition to providing the modulation frequencies for the first SHD frequency 123 and the second sideband heterodyne frequency 129, the frequency switching controller 131 may also provide a frequency to the CCW resonance tracking electronics 111 and the CW resonance tracking electronics 147. Accordingly, the demodulator 109 and the demodulator 139 may each demodulate received signals at respectively twice the $f_{SHD-,+}$ and the $f_{SHD+,-}$. In some embodiments, the CCW resonance tracking electronics 111 and the CW resonance tracking electronics 147 receive the demodulation frequencies from both the frequency switching controller 131 and respective frequency generators of the first SHD frequency 123 and the second SHD frequency 129. Accordingly, the demodulation frequencies used by the demodulators 109 and 139 may be switched in a similar manner to the first SHD frequency 123 and the second SHD frequency 129. Accordingly, the RFOG 101 may suppress both modulation imperfection errors and optical backscatter errors.

Figure 2:
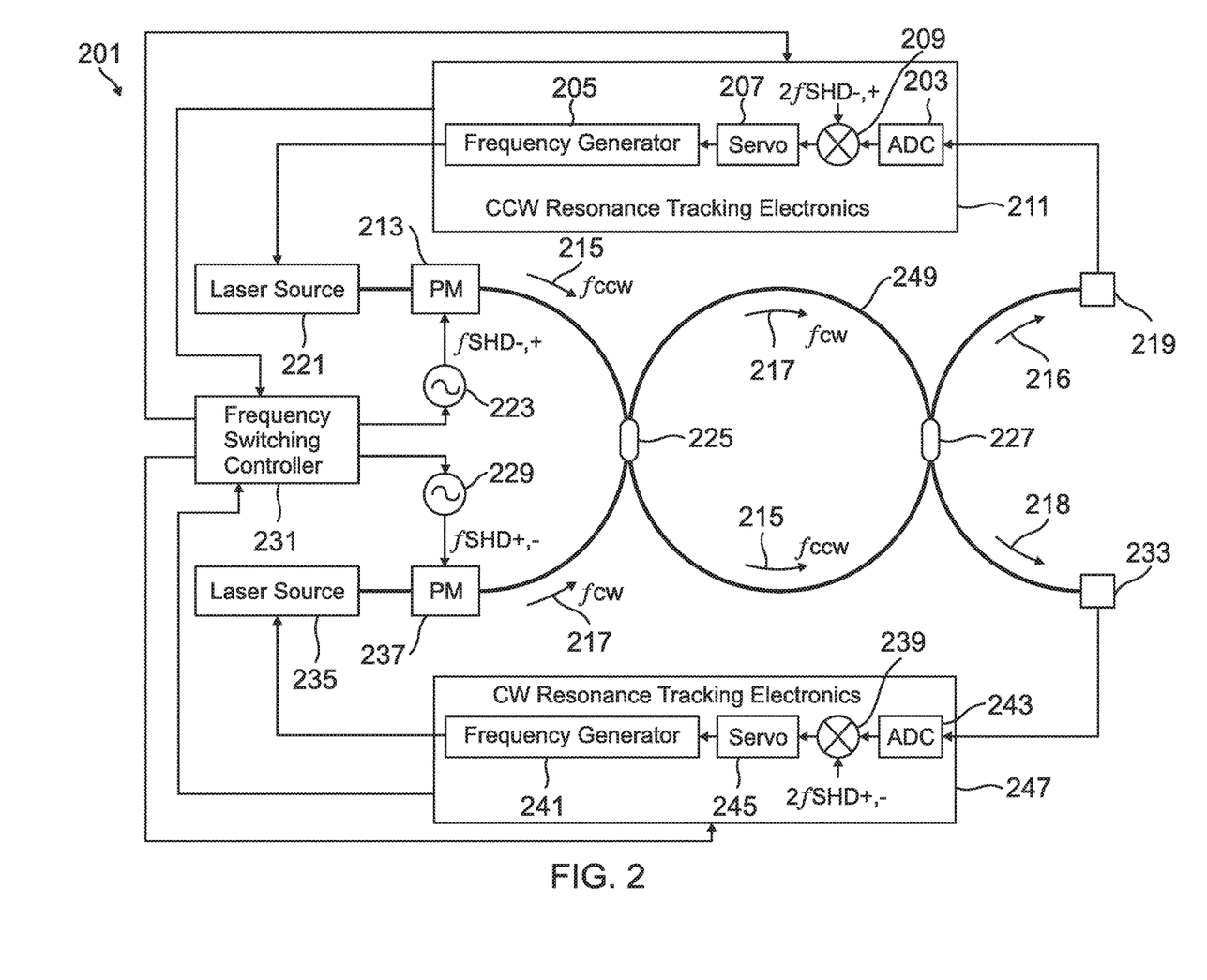
FIG. 2 is a block diagram illustrating an exemplary resonator fiber optic gyroscope that employs sideband heterodyne and resonance mode switching according to an aspect of the present disclosure.

FIG. 2 is a schematic diagram illustrating an exemplary RFOG 201. The RFOG 201 may function similarly to the RFOG 101 described above in FIG. 1, with the exception that RFOG 201 also implements resonance switching. For example, the RFOG 201 may include a first laser source 221, a second laser source 235, a first phase modulator 213, a second phase modulator 237, a first heterodyne frequency 223, a second heterodyne frequency 229, couplers 225 and 227, a resonator 249, a first photodetector 219, and a second photodetector 233 that function similarly to the first laser source 121, the second laser source 135, the first phase modulator 113, the second phase modulator 137, the first heterodyne frequency 123, the second heterodyne frequency 129, the couplers 125 and 127, the resonator 149, the first photodetector 119, and the second photodetector 133 in FIG. 1. Accordingly, the RFOG 201 provides for sideband heterodyne modulation as described above in FIG. 1.

As discussed above, the first laser source 221 may be controlled such that the first optical beam 215 is locked to a resonant mode. Similarly, the second laser source 235 may be controlled such that the second optical beam 217 is also locked to a resonant mode. In some embodiments, the first optical beam 215 may be locked to a first resonant mode and the second optical beam 217 may be locked to a second resonant mode, where the first resonant mode and the second resonant mode are separated from each other by an integer multiple of the free spectral range. To lock the first optical beam 215 and the second optical beam 217 to their respective resonant modes, the RFOG 201 may include feedback control that includes a CCW resonance switching electronics 211 and a CW resonance switching electronics 247.

In some embodiments, the CCW resonance switching electronics 211 and the CW resonance switching electronics 247 function similarly to the CCW resonance tracking electronics 111 and the CW resonance tracking electronics 147 described above in FIG. 1. However, the CCW resonance switching electronics 211 and the CW resonance switching electronics 247 are referred to as "resonance switching" because the embodiments described with reference to RFOG 201 periodically swap the respective resonant modes used for the first optical beam 215 and the second optical beam 217. That is, after operating for a fixed period of time with the first optical beam 215 at a first resonant mode and the second optical beam 217 at a second resonant mode, the resonance switching electronics 211 and 247 will simultaneously switch the resonant mode of the first optical beam 215 from the first resonant mode to the second resonant mode and the resonant mode of the second optical beam 217 from the second resonant mode to the first resonant mode. Then, after operating for the fixed period of time with the first optical beam 215 at the second resonant mode and the second optical beam 217 at the first resonant mode, the resonance switching electronics 211 and 247 will simultaneously switch the resonant mode of the first optical beam 215 from the second resonant mode back to the first resonant mode and the resonant mode of the second optical beam 217 from the first resonant mode back to the second resonant mode. Alternating each optical beam between different resonant modes in this manner further facilitates mitigation of interference type backscatter error, errors caused by temperature induced variations in the free spectral range, and line shape asymmetry grading errors caused by optical backscatter or back-reflections. Resonance switching is described in greater detail in U.S. Pat. No. 9,772,189, which is titled "SYSTEMS AND METHODS FOR RESONANCE SWITCHING RESONATOR FIBER OPTIC GYROSCOPES (RFOGS) WITH FEED-FORWARD PROCESSING", herein incorporated in its entirety by reference.

In certain embodiments, the CCW resonance switching electronics 211 receive signals from the frequency switching controller 231 and the first SHD frequency 223 such that the demodulator 209 may demodulate received signals from the ADC 203 at twice the modulated first SHD frequency 223 $f_{SHD-,+}$. Similarly, the CW resonance switching electronics 247 may receive signals from the frequency switching controller 231 and the second SHD frequency 229 such that the demodulator 239 may demodulate received signals from the ADC 243 at twice the modulated second SHD frequency 229 $f_{SHD+,-}$. The frequency switching controller 231 periodically swap the modulation of the first SHD frequency 223 and the modulation of the second SHD frequency 229 as described above with respect to FIG. 1. Thus, systems within the RFOG 201 periodically switch both the resonant modes of the first optical beam and the second optical beam 217 (referred to hereafter as "resonant mode switching") and the modulation of the first SHD frequency 223 and the second SHD frequency 229 (referred to hereafter as "sideband heterodyne switching").

As described herein, the period of the resonant mode switching and the period of the sideband heterodyne switching may be independent from one another. For example, the sideband heterodyne switching may occur at different times than the resonant mode switching. Alternatively, the period of the resonant mode switching and the period of the sideband heterodyne switching may be related to one another, such that either the sideband heterodyne switching may be limited to occur when resonant mode switching occurs or resonant mode switching is limited to occur when sideband modulation occurs. For example, the sideband heterodyne switching period may be equal to the resonant mode switching period, the sideband heterodyne switching period may be equal to an integer multiple of resonant mode switching periods, or the resonant mode switching periods may be equal to an integer multiple of sideband heterodyne switching periods.

In certain embodiments, the RFOG 201, or larger system controlling the RFOG 201, may filter out some or all of the measurements produced within or by the RFOG 201 when the resonant mode switching or the sideband heterodyne switching occurs. For example, when the resonant mode switching or the sideband heterodyne switching happens, transient signals may be produced that could cause errors in the measurements produced within the RFOG 201. Accordingly, by filtering out measurements produced when the resonant mode switching or the sideband heterodyne switching occurs, the transient signals may have a limited effect on the measurements produced by the RFOG 201. Thus, by having the period of the resonant mode switching and the period of the sideband heterodyne switching related to one another, there may be less moments when measurements are filtered.

In some embodiments, to coordinate the periods of the resonant mode switching and the sideband heterodyne switching, the frequency switching controller 231 may receive a signal from and provide a signal to the resonant switching electronics 211 and 247. For example, the resonance switching electronics 211 and 247 may send an indicator that resonant modes are switching to the frequency switching controller 231, where upon the frequency switching controller 231 may perform the sideband heterodyne switching. Alternatively, the frequency switching controller 231 may send an indicator that the sideband modulation switch is occurring to the resonant switching electronics 211 and 247, whereupon the resonance switching electronics 211 and 247 may perform the resonant mode switching. In an alternative embodiment, a processor (not shown) may direct and coordinate the resonant mode switching and the sideband heterodyne switching by sending signals to both the frequency switching controller 231 and the resonance switching electronics 211 and 247. In a further embodiment, the frequency switching controller 231 are part of the resonance switching electronics 211 and 247 or are part of the processor.

Figure 3A:
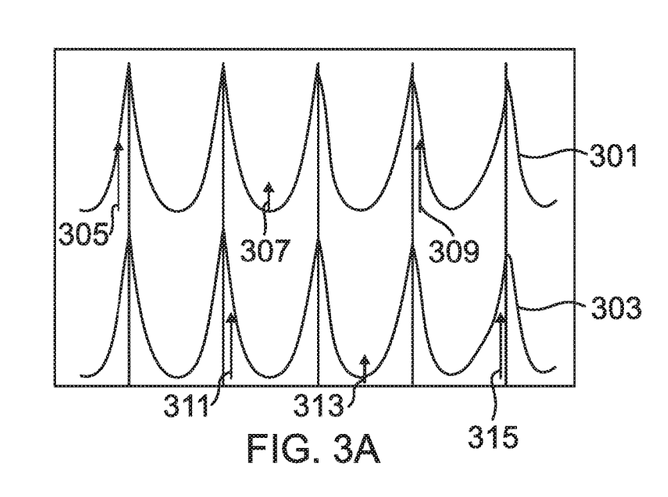
FIG. 3A-3D is a diagram illustrating multiple frequency graphs showing various combinations of sideband heterodyne frequencies and resonance frequencies according to an aspect of the present disclosure.

FIGS. 3A-3D illustrates several graphs 301a-301d that illustrate different frequencies of the optical beams as they propagate within the resonator 249. For example, FIG. 3A illustrates a graph of different optical beam frequencies that propagate within the resonator 249 in the CW direction and in the CCW direction. When an RFOG implements sideband heterodyne modulation, each optical beam may have a lower sideband frequency, a carrier frequency and an upper sideband frequency. For example, the optical beam that propagates in the CW direction may have a portion that propagates at a lower sideband frequency 305, a carrier frequency 307, and an upper sideband frequency 309. Also, the optical beam that propagates in the CCW direction 303 may have a portion that propagates at a lower sideband frequency 311, a carrier frequency 313, and an upper sideband frequency 315.

Further, a resonator may have one or more resonant modes as illustrated by the CW resonance graph 301 and the CCW resonance graph 303. As illustrated, the resonator has multiple resonant peaks or modes in the CW direction and the CCW direction, where the distance between adjacent resonant peaks is equal to the free spectral range for the resonator. As shown, both the CW carrier frequency 307 and the CCW carrier frequency 313 are located at frequencies between two resonant peaks. Also, the CW carrier frequency 307 is separated from the CCW carrier frequency 313 by a multiple of the free spectral range.

As illustrated, the sideband frequencies may be separated from the carrier frequencies by one and a half times the free spectral range. For example, the lower CW sideband frequency 305 may be located proximate to a resonant mode that is one and a half free spectral ranges below the CW carrier frequency 307 and the upper CW sideband frequency 309 may be located proximate to a resonant mode that is one and a half free spectral ranges above the CW carrier frequency 307. Similarly, the lower CCW sideband frequency 311 may be located proximate to a resonant mode that is one and a half free spectral ranges below the CCW carrier frequency 313 and the upper CCW sideband frequency 315 may be located proximate to a resonant mode that is one and a half free spectral ranges above the CCW carrier frequency 313.

In certain embodiments, the carrier frequencies are modulated such that the sideband of optical beams are locked away from their resonant modes by an offset frequency and the opposite propagating beams are offset in different directions from their respective resonant modes. For example, the CW sideband frequencies may be offset from the CW carrier frequency 307 by one and a half free spectral ranges plus the offset frequency. In contrast, the CCW sideband frequencies may be offset from the CCW carrier frequency 313 by one and a half free spectral ranges minus the offset frequency. By separating the sideband frequencies by the offset frequency, backscatter errors may be suppressed as described above with respect to FIG. 1.

Figure 3B:
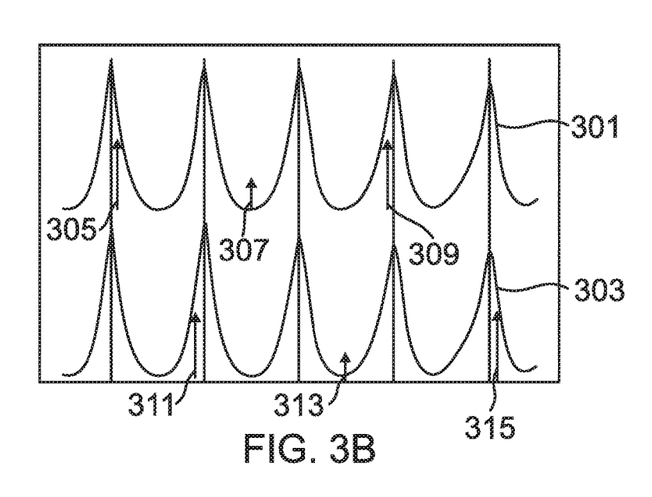

As described above, an RFOG may implement sideband heterodyne switching. FIG. 3B illustrates a graph of different optical beam frequencies that propagate within a resonator 149 or 249 where the direction of sideband modulation offset for the optical beams propagating in opposite directions within the resonator has switched from the direction of sideband modulation described above in FIG. 3A. For example, when a sideband modulation switch occurs to the arrangement of sideband frequencies described above in FIG. 3A, the CW sideband frequencies 305 and 309 may be offset from the CW carrier frequency 307 by one and a half free spectral ranges minus the offset frequency. Also, the CCW sideband frequencies 311 and 315 may be offset from the CCW carrier frequency 313 by one and a half free spectral ranges plus the offset frequency. As described above, sideband modulation switches happen periodically such that over time each upper and lower sideband frequency for both optical beams may be at the resonant frequency on average.

Figure 3C:
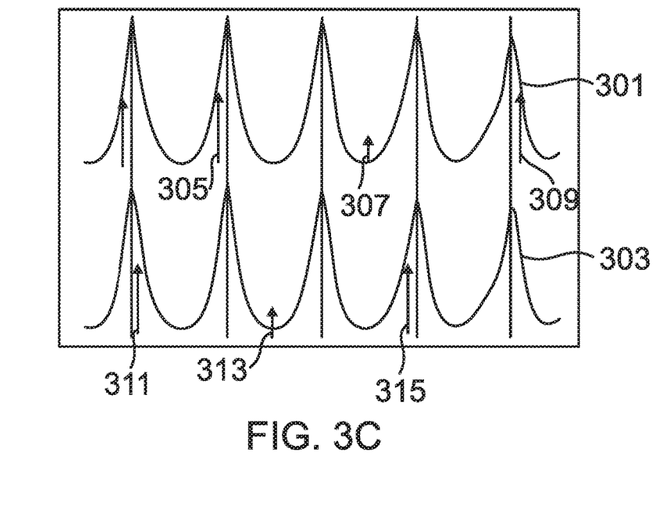

Further, an RFOG may implement resonant mode switching as described above with respect to FIG. 2. FIG. 3C illustrates a graph of different optical beam frequencies that propagate within a resonator 249 where the resonant mode has switched for the optical beams propagating in opposite directions from the resonant modes described above in FIG. 3A. When an RFOG performs resonant mode switching, the sideband modulation of the optical beams in the resonator stays the same, but the carrier frequency for the opposite propagating optical beams may switch with one another. For example, the CW carrier frequency 307 and the CCW carrier frequency 313 may switch with one another. Accordingly, the CW carrier frequency 307 in FIG. 3C is equal to the CCW carrier frequency 313 in FIG. 3A and the CCW carrier frequency 313 in FIG. 3C is equal to the CW carrier frequency 307 in FIG. 3A.

Figure 3D:
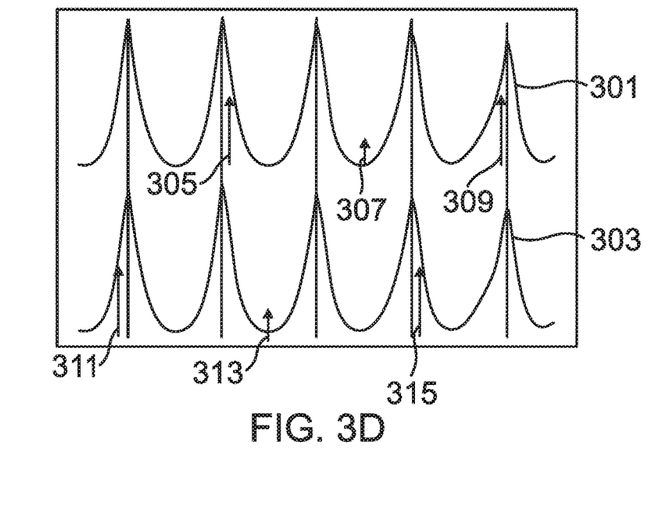

Further, an RFOG may implement both resonant mode switching and sideband heterodyne switching as described above with respect to FIG. 2. FIG. 3D illustrates a graph of different optical beam frequencies that propagate within a resonator 249 where both the resonant mode and the sideband modulation have switched for the optical beams propagating in opposite directions from the resonant modes and sideband modulation described above in FIG. 3A. Accordingly, the CW carrier frequency 307 in FIG. 3D is equal to the CCW carrier frequency 313 in FIG. 3A in the CCW carrier frequency 313 in FIG. 3D is equal to the CW carrier frequency 307 in FIG. 3A. Also, the CW sideband frequencies 305 and 309 may be offset from the CW carrier frequency 307 by one and a half free spectral ranges minus the offset frequency. Also, the CCW sideband frequencies 311 and 315 may be offset from the CCW carrier frequency 313 by one and a half free spectral ranges plus the offset frequency. An RFOG may perform any combination of resonant mode switches and sideband modulation switches as described above in FIGS. 3A-3D.

Figure 4:
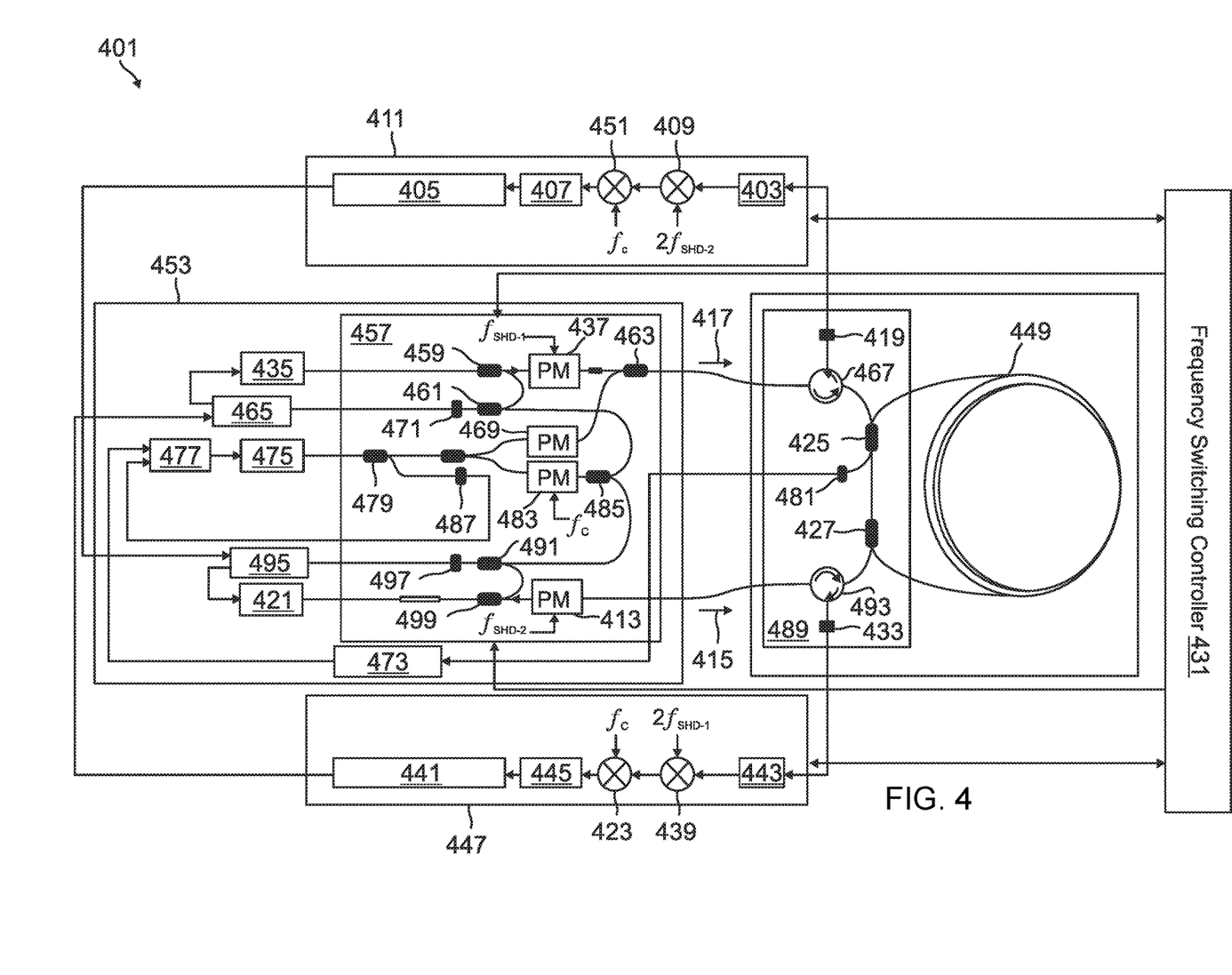
FIG. 4 is a block diagram illustrating an exemplary resonator fiber optic gyroscope that employs sideband heterodyne according to an aspect of the present disclosure.

FIG. 4 is a schematic drawing of an additional embodiment of an RFOG 401 similar to other examples described above that implement sideband heterodyne switching and, in some implementations, resonant mode switching. The RFOG 401 may function within a navigation system, a platform stabilization system, appointing system, or other system where rotational information may provide a practical application. For example, in some embodiments, the RFOG 401 may be implemented as part of an inertial sensor unit that includes one or more RFOGs and one or more linear accelerometers. The RFOG 401 may measure rotational rate and outputs a signal indicative of rotation rate. The measured rotation rate from the RFOG 401 may be used to calculate parameters such as position, orientation, and angular velocity. The calculated parameters, in some embodiments, may be used for control signals that are outputted to one or more optional actuators.

The RFOG 401 may include many similar components to the RFOGs 101 and 201 described above in connection with FIGS. 1 and 2. For example, the laser sources 421 and 435, the resonance tracking electronics 411 and 447, the ADCs 403 and 443, the demodulators 409 and 439, the servos 407 and 445, the frequency generators 405 and 441, the phase modulators 413 and 437, the optical beams 415 and 417, the frequency switching controller 431, and the resonator 449 function in similar manners to components having corresponding numbers (4XX corresponding to 2XX and 1XX) described above in FIGS. 1 and 2.

In some embodiments, optical beams from laser sources 421 and 435 may circulate through the resonator 449. The optical beams may be coupled into the resonator 449 at the couplers 425 and 427 so that light can propagate within the resonator 449. In some implementations, the couplers 425 and 427 may be mirrors, fiber optic couplers, waveguides, or other suitable component for coupling light into the resonator 449. In some embodiments, each of the couplers 425 and 427 may function as both input ports and output ports for the resonator 449. For example, the coupler 425 may couple light into the resonator 449 in a first direction (e.g., clockwise). Similarly, the coupler 427 may couple light into the resonator 449 in a second and opposite direction (e.g., counter-clockwise).

In some implementations, the couplers 425 and 427 may be formed on a silicon optical bench 489, where the silicon optical bench may include transmission ports and reflection ports. Also, the silicon optical bench may include circulators 467 and 493. The circulators 467 and 493 may receive optical beams 415 and 417 from the laser sources 421 and 435 and circulate the received optical beams 415 and 417 to the couplers 425 and 427 to be subsequently propagated within the resonator 449. Additionally, the circulators 467 and 493 may receive light from the couplers 425 and 427 that has propagated within the resonator 449 and provide the light from the couplers 425 and 427 to photodetectors 419 and 433. For example, the circulator 467 may receive the second optical beam 417 and provide the second optical beam 417 to the coupler 425, where the coupler 425 couples the second optical beam 417 into the resonator 449. Additionally, the coupler 425 may couple the first optical beam 415 out of the resonator 449 and provide the first optical beam 415 to the circulator 467, whereupon the circulator 467 provides the received first optical beam 415 to the first photodetector 419. Similarly, the circulator 493 may receive the first optical beam 415 and provide the first optical beam 415 to the coupler 427, where the coupler 427 couples the first optical beam 415 into the resonator 449. Also, the coupler 427 may couple the second optical beam 417 out of the resonator 449 and provide the second optical beam 417 to the circulator 493, whereupon the circulator 493 provides the received second optical beam 417 to the second photodetector 433. Additionally, the coupler 425 may couple a portion of light propagating within the resonator 449 for detection by a third photodetector 481.

In additional embodiments, the silicon optical bench 489 may include two transmission ports and a reflection port of the resonator 449. For example, the signals provided by the first photodetector 419 and the second photodetector 433 are output through the two transmission ports. Also, the signal provided by the third photodetector 481 is output through the reflection port. In general, light detected at the transmission ports has propagated through the resonator, whereas at the reflection port there is a combination of the portion of the resonator incident light that did not enter the resonator and light that has propagated through the resonator. For example, the photodetector 419 provides a signal through a transmission port that is based on light coupled into the resonator 449 through the coupler 427. The photodetector 433 provides a signal through a transmission port that is based on light coupled into the resonator 449 through the coupler 425. The photodetector 481 provides a signal through the reflection port that is based on light provided by the coupler 425 that includes both light from the resonator 449 and the circulator 467.

In certain embodiments, light that is coupled into the resonator 449 may be frequency stabilized using the resonator 449 with feedback control based on light detected at the photodetectors 419 and 433. Further, in some embodiments where a light produced by a master laser 475 is used to further stabilize the frequency of the light propagating within the resonator 449, light may further be stabilized to signals provided by the third photodetector 481. Feedback control may stabilize optical beams that propagate within the resonator 449 at both high and low frequencies.

In some embodiments, feedback control may reduce phase noise using the Pound-Drever-Hall (PDH) technique. A laser source with PDH feedback control 473 receives a signal from the third photodetector 481 that provides a signal from the reflection port of the silicon optical bench 489 that is associated with the master laser source 475. The response of the resonator 449 to changes in relative frequency between optical beams propagating therein and the resonator 449 may be faster at the reflection port than the transmission ports. To stabilize the master laser provided by the master laser source 475 and thus, reduce the phase noise of the master laser, the master laser source 475 may be locked onto a CW resonance of the resonator 449 by using the PDH feedback control 473.

In some embodiments, the resonance line shape at the reflection port may have significantly more asymmetry than the resonance line shape at the transmission ports. The significantly larger asymmetry in the reflection port line shape may result in bias errors and low-frequency drift errors in the relative frequency between the master laser and the resonator 449. Since changes in line shape asymmetry may be driven mostly by thermal effects, the frequency drift errors may typically be at relatively low frequencies. The bias errors and low-frequency drift errors may be corrected by using the transmission ports to lock the laser sources 435 and 421 to the resonator 449.

The low relative frequency noise between the master laser and the resonator 449 may be transferred to the optical beams 415 and 417 by employing phase lock loops 465 and 495 that function to lock the optical beams 415 and 417 to the master laser produced by the master laser source 475 using light from the master laser that is detected at photodetectors 471 and 497. To lock the optical beams 415 and 417 to corresponding resonance frequencies of the resonator 449, transmission mode feedback control may be used to lock the sidebands of the lasers to the resonant modes of the resonator 449. Each optical beam that is slaved to the light produced by the master laser source 475 may have an associated feedback control that receives a signal from one of the photodetectors 419 and 433 associated with the transmission ports.

In further embodiments, where light produced by the master laser source 475 is controlled through PDH feedback control 473 and a master servo 477, the output of the master laser source 475 may be coupled for detection by the photodetectors 471 and 497 through couplers 469 and 491. Further, the output of the master laser source 475 may be coupled into the resonator 449 through the coupler 463. The master laser source 475 may be configured to generate light for circulation within the resonator 449. The light produced by the master laser source 475 may receive PDH feedback for locking the frequency of the light from the master laser source 475 to the resonance frequency of the resonator 449 as detected by the photodetector 481. The PDH feedback control 473 may be coupled to a servo 477 (that also receives a signal associated with the master laser through the coupler 479 and photodetector 487) that is coupled to modulate the light produced by the master laser source 475 with the PDH modulation signal and adjust the light produced by the master laser source 475 towards the resonance of the resonator 449.

As illustrated, the first optical beam 415 and the second optical beam 417 are locked to the light produced by the master laser source 475. Locking the first optical beam 415 and the second optical beam 417 to the light produced by the master laser source 475 may provide the first optical beam 415 and the second optical beam 417 with a frequency noise reduction of the PDH feedback control 473. Additionally, locking the first optical beam 415 and the second optical beam 417 to the light produced by the master laser source 475 may also provide common modulation to the first optical beam 415 and the second optical beam 417. For example, master laser may be modulated with the common frequency at the phase modulators 483 and 469. The output from the phase modulator 483 may then be coupled to both the optical phase locked loop electronics 465 and 495 through the couplers 469 and 491 and photodetectors 461 and 497. The optical phase locked loop electronics 465 and 495 may then lock the first optical beam 415 and the second optical beam 417 to the commonly modulated master laser. Further, resonance tracking electronics 411 and 447 may respectively include common demodulators 451 and 423, that function to demodulate the signals received from the heterodyne demodulators 409 and 439, which function substantially similarly to the demodulators 109, 209, 139, and 239 described above in FIGS. 1 and 2.

As illustrated, component of the RFOG 401 may be fabricated on a multifrequency laser source 453. The multifrequency laser source 453 may include the laser sources 435, 475, and 421 and phase lock loops and control electronics for the laser sources 435, 475, and 421. In some embodiments the multifrequency laser source 453 may include a silicon photonics chip (SiP) 457 that includes components for modulating the optical beams within the RFOG 401. As described above, the use of sideband heterodyne switching aids in suppressing optical backscatter errors such that low cost SiP chips (such as the SiP chip 457) may be used to provide the sideband heterodyne modulation.

Figure 5:
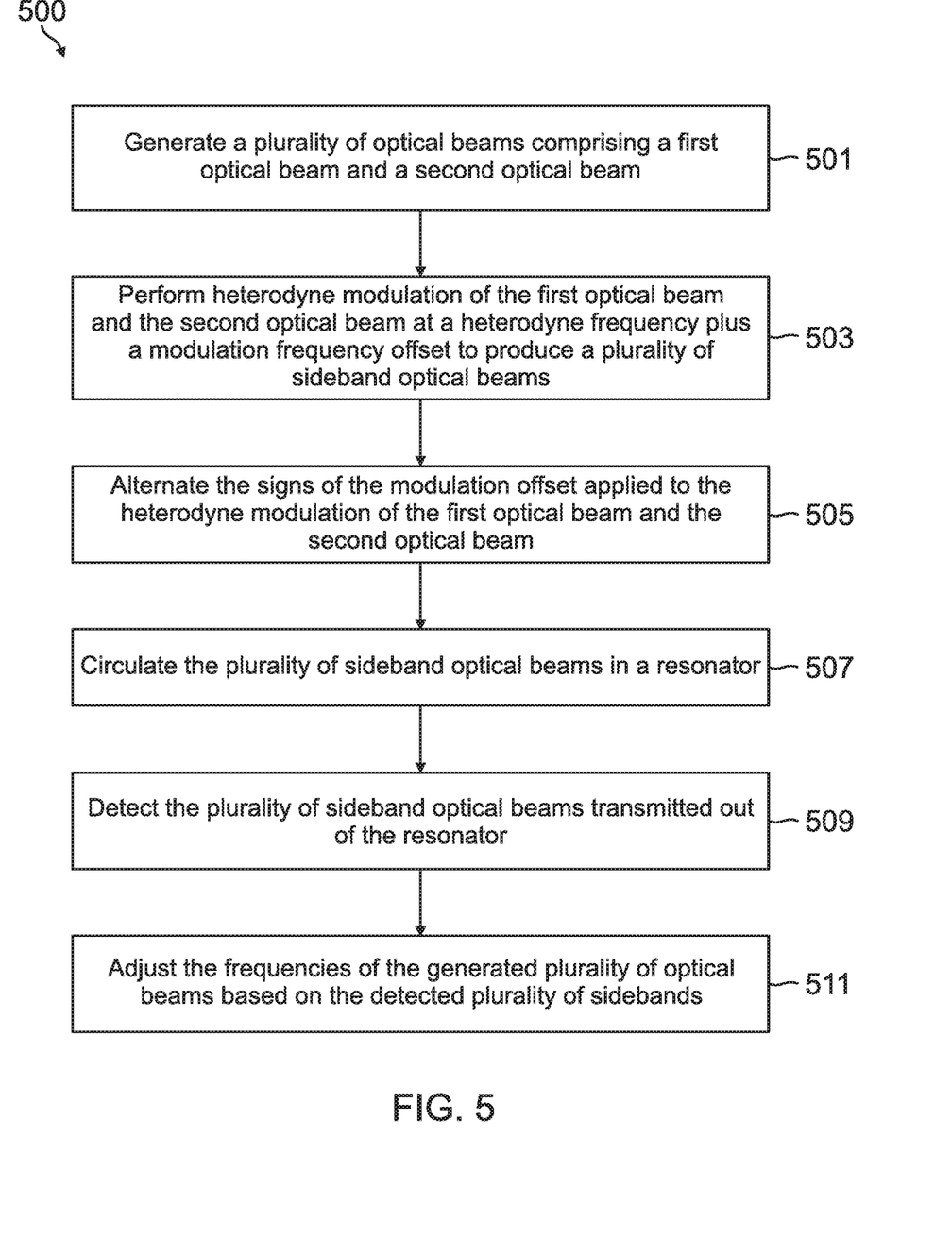
FIG. 5 is a flowchart diagram illustrating a method for performing sideband heterodyne switching according to an aspect of the present disclosure.

FIG. 5 is a flow chart diagram of a method 500 for performing sideband heterodyne switching in an RFOG. The method 500 proceeds at 501, where a plurality of optical beams comprising a first optical beam and a second optical beam are generated. Additionally, method 500 proceeds at 503, where heterodyne modulation of the first optical beam and the second optical beam are performed at a heterodyne frequency plus a modulation frequency offset to produce a plurality of sideband optical beams. In some embodiments, the modulation offset may have a different sign for the heterodyne modulation of the first optical beam than the modulation of the second optical beam.

In certain embodiments, the method 500 proceeds at 505, where the signs of the modulation frequency offset applied to the heterodyne modulation of the first optical beam and the second alternate beam is alternated. In some implementations, due to the alternating modulation frequency offsets, the heterodyne modulation modulates the first optical beam and the second optical beam substantially on average at the heterodyne frequency during a period of time. Further, the method 500 proceeds at 507, where the plurality of sideband optical beams are circulated within a resonator. Also, the method 500 proceeds at 509, where the plurality of sideband optical beams that are transmitted out of the resonator are detected. Additionally, the method 500 proceeds at 511, where the frequencies of the generated plurality of optical beams are adjusted based on the detected plurality of sideband optical beams.

EXAMPLE EMBODIMENTS

Example 1 includes a system comprising: a resonator configured to allow light to resonate therein; at least one laser source configured to produce a plurality of optical beams, the plurality of optical beams comprising a first optical beam and a second optical beam; a plurality of heterodyne modulators that perform heterodyne modulation of the first optical beam and the second optical beam at a heterodyne frequency plus a modulation frequency offset to produce a plurality of sideband optical beams at a plurality of sideband frequencies, wherein the modulation frequency offset has a different sign for the first optical beam and the second optical beam; a frequency switching controller that performs sideband heterodyne switching that alternatingly switches the signs of the modulation frequency offset applied to the first optical beam and the second optical beam, wherein the heterodyne modulation of the first optical beam and the second optical beam are on average substantially at the heterodyne frequency during a period of time; at least one coupler configured to couple the plurality of sideband optical beams into the resonator; and a feedback control coupled to the resonator that detects the plurality of sideband optical beams transmitted out of the resonator and adjusts frequencies of the plurality of optical beams based on the detected plurality of sideband optical beams.

Example 2 includes the system of Example 1, wherein the first optical beam and the second optical beam are generated to propagate within the resonator at different resonant modes.

Example 3 includes the system of Example 2, wherein the frequency switching controller periodically performs resonant mode switching, wherein the resonant mode switching switches resonant modes of the first optical beam and the second optical beam.

Example 4 includes the system of Example 3, wherein the frequency switching controller performs the sideband heterodyne switching and the resonant mode switching at the same period.

Example 5 includes the system of any of Examples 3-4, wherein the frequency switching controller performs the sideband heterodyne switching and the resonant mode switching at different periods that are harmonically related to one another.

Example 6 includes the system of any of Examples 1-5, wherein the plurality of heterodyne modulators are located on a silicon photonics chip.

Example 7 includes the system of any of Examples 1-6, wherein the feedback control demodulates the detected plurality of sidebands at a demodulation frequency that is twice of the combination of the heterodyne frequency and the corresponding modulation frequency offset.

Example 8 includes the system of any of Examples 1-7, wherein the modulation frequency offset is applied to the heterodyne frequency by modulating the heterodyne frequency by an offset frequency.

Example 9 includes the system of any of Examples 1-8, wherein frequencies of the first optical beam and the second optical beam are locked to a reference frequency of a master laser.

Example 10 includes a method comprising: generating a plurality of optical beams, the plurality of optical beams comprising a first optical beam and a second optical beam; performing heterodyne modulation of the first optical beam and the second optical beam at a heterodyne frequency plus a modulation frequency offset to produce a plurality of sideband optical beams at a plurality of sideband frequencies, wherein the modulation frequency offset has a different sign for the heterodyne modulation of the first optical beam than the modulation of the second optical beam; alternating the signs of the modulation frequency offset applied to the heterodyne modulation of the first optical beam and the second optical beam, wherein the heterodyne modulation modulates the first optical beam and the second optical beam substantially on average at the heterodyne frequency during a period of time; circulating the plurality of sideband optical beams in a resonator; detecting the plurality of sideband optical beams transmitted out of one or more ports of the resonator; adjusting the frequencies of the generated plurality of optical beams based on the detected plurality of sideband optical beams.

Example 11 includes the method of Example 10, wherein generating the plurality of optical beams comprises generating the first optical beam and the second optical beam to propagate within the resonator at different resonant modes.

Example 12 includes the method of Example 11, further comprising periodically performing resonant mode switching, wherein the resonant mode switching switches carrier frequencies of the first optical beam and the second optical beam.

Example 13 includes the method of Example 12, further comprising performing the sideband heterodyne switching and the resonant mode switching at the same period.

Example 14 includes the method of any of Examples 12-13, further comprising performing the sideband heterodyne switching and the resonant mode switching at different periods that are harmonically related to one another.

Example 15 includes the method of any of Examples 10-14, wherein the plurality of heterodyne modulators are located on a silicon photonics chip.

Example 16 includes the method of any of Examples 10-15, further comprising demodulating the detected plurality of sidebands at a demodulation frequency that is twice of the combination of the heterodyne frequency and the corresponding modulation frequency offset.

Example 17 includes the method of any of Examples 10-16, performing heterodyne modulation of the first optical beam and the second optical beam comprises modulating the heterodyne frequency by a respective offset frequency.

Example 18 includes the method of any of Examples 10-17, further comprising locking the frequencies of the first optical beam and the second optical beam to a reference frequency of a master laser.

Example 19 includes a resonator fiber-optic gyroscope comprising: a resonator configured to allow light to resonate therein, wherein the resonator has a plurality of resonant modes, each resonant mode separated by a free spectral range; a first laser source that produces a first optical beam having a first frequency; a first heterodyne modulator to modulate the first optical beam at a first offset heterodyne frequency to produce first sideband signals that are offset by the first offset from first sideband resonant modes in the plurality of resonant modes, wherein the first sideband signals propagate in the resonator in a first direction; a second laser source that produces a second optical beam having a second frequency; a second heterodyne modulator to modulate the second optical beam at a second offset heterodyne frequency to produce second sideband signals that are offset by the second offset from second sideband resonant modes in the plurality of resonant modes, wherein the second sideband signals propagate in the resonator in a second direction that is opposite to the first direction; a first feedback control configured to: detect the first sideband signals received from a first port of the resonator to produce a first detected signal; demodulate the first detected signal to form a first demodulated signal; and adjust the first frequency such that the first sideband signals move closer to being offset by the first offset from the first sideband resonant modes based on the first demodulated signal; and a second feedback control configured to: detect the second sideband signal received from a second port of the resonator to produce a second detected signal; demodulate the second detected signal to form a second demodulated signal; and adjust the second frequency such that the second sideband signals move closer to being offset by the first offset from the second sideband resonant modes based on the second demodulated signal; a frequency switching controller that periodically switches the first offset to a value of the second offset and the second offset to a value of the first offset.

Example 20 includes the resonator fiber-optic gyroscope of Example 19, wherein the frequency switching controller periodically swaps the first sideband resonant modes and the second sideband resonant modes.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
a resonator configured to allow light to resonate therein;
at least one laser source configured to produce a plurality of optical beams, the plurality of optical beams comprising a first optical beam and a second optical beam;
a plurality of heterodyne modulators that perform heterodyne modulation of the first optical beam and the second optical beam at a heterodyne frequency plus a modulation frequency offset to produce a plurality of sideband optical beams at a plurality of sideband frequencies, wherein the modulation frequency offset has a different sign for the first optical beam and the second optical beam;
a frequency switching controller that performs sideband heterodyne switching that alternatingly switches the signs of the modulation frequency offset applied to the first optical beam and the second optical beam, wherein the heterodyne modulation of the first optical beam and the second optical beam are on average substantially at the heterodyne frequency during a period of time;
at least one coupler configured to couple the plurality of sideband optical beams into the resonator; and
a feedback control coupled to the resonator that detects the plurality of sideband optical beams transmitted out of the resonator and adjusts frequencies of the plurality of optical beams based on the detected plurality of sideband optical beams.

2. The system of claim 1, wherein the first optical beam and the second optical beam are generated to propagate within the resonator at different resonant modes.

3. The system of claim 2, wherein the frequency switching controller periodically performs resonant mode switching, wherein the resonant mode switching switches resonant modes of the first optical beam and the second optical beam.

4. The system of claim 3, wherein the frequency switching controller performs the sideband heterodyne switching and the resonant mode switching at the same period.

5. The system of claim 3, wherein the frequency switching controller performs the sideband heterodyne switching and the resonant mode switching at different periods that are harmonically related to one another.

6. The system of claim 1, wherein the plurality of heterodyne modulators are located on a silicon photonics chip.

7. The system of claim 1, wherein the feedback control demodulates the detected plurality of sidebands at a demodulation frequency that is twice of the combination of the heterodyne frequency and the corresponding modulation frequency offset.

8. The system of claim 1, wherein the modulation frequency offset is applied to the heterodyne frequency by modulating the heterodyne frequency by an offset frequency.

9. The system of claim 1, wherein frequencies of the first optical beam and the second optical beam are locked to a reference frequency of a master laser.

10. A method comprising:
generating a plurality of optical beams, the plurality of optical beams comprising a first optical beam and a second optical beam;
performing heterodyne modulation of the first optical beam and the second optical beam at a heterodyne frequency plus a modulation frequency offset to produce a plurality of sideband optical beams at a plurality of sideband frequencies, wherein the modulation frequency offset has a different sign for the heterodyne modulation of the first optical beam than the modulation of the second optical beam;
alternating the signs of the modulation frequency offset applied to the heterodyne modulation of the first optical beam and the second optical beam, wherein the heterodyne modulation modulates the first optical beam and the second optical beam substantially on average at the heterodyne frequency during a period of time;
circulating the plurality of sideband optical beams in a resonator;
detecting the plurality of sideband optical beams transmitted out of one or more ports of the resonator;
adjusting the frequencies of the generated plurality of optical beams based on the detected plurality of sideband optical beams.

11. The method of claim 10, wherein generating the plurality of optical beams comprises generating the first optical beam and the second optical beam to propagate within the resonator at different resonant modes.

12. The method of claim 11, further comprising periodically performing resonant mode switching, wherein the resonant mode switching switches carrier frequencies of the first optical beam and the second optical beam.

13. The method of claim 12, further comprising performing the sideband heterodyne switching and the resonant mode switching at the same period.

14. The method of claim 12, further comprising performing the sideband heterodyne switching and the resonant mode switching at different periods that are harmonically related to one another.

15. The method of claim 10, wherein the plurality of heterodyne modulators are located on a silicon photonics chip.

16. The method of claim 10, further comprising demodulating the detected plurality of sidebands at a demodulation frequency that is twice of the combination of the heterodyne frequency and the corresponding modulation frequency offset.

17. The method of claim 10, performing heterodyne modulation of the first optical beam and the second optical beam comprises modulating the heterodyne frequency by a respective offset frequency.

18. The method of claim 10, further comprising locking the frequencies of the first optical beam and the second optical beam to a reference frequency of a master laser.

19. A resonator fiber-optic gyroscope comprising:
a resonator configured to allow light to resonate therein, wherein the resonator has a plurality of resonant modes, each resonant mode separated by a free spectral range;
a first laser source that produces a first optical beam having a first frequency;
a first heterodyne modulator to modulate the first optical beam at a first offset heterodyne frequency to produce first sideband signals that are offset by the first offset from first sideband resonant modes in the plurality of resonant modes, wherein the first sideband signals propagate in the resonator in a first direction;

a second laser source that produces a second optical beam having a second frequency;

a second heterodyne modulator to modulate the second optical beam at a second offset heterodyne frequency to produce second sideband signals that are offset by the second offset from second sideband resonant modes in the plurality of resonant modes, wherein the second sideband signals propagate in the resonator in a second direction that is opposite to the first direction;

a first feedback control configured to:
  detect the first sideband signals received from a first port of the resonator to produce a first detected signal;
  demodulate the first detected signal to form a first demodulated signal; and
  adjust the first frequency such that the first sideband signals move closer to being offset by the first offset from the first sideband resonant modes based on the first demodulated signal; and a second feedback control configured to:
  detect the second sideband signal received from a second port of the resonator to produce a second detected signal;
  demodulate the second detected signal to form a second demodulated signal; and
  adjust the second frequency such that the second sideband signals move closer to being offset by the first offset from the second sideband resonant modes based on the second demodulated signal;

a frequency switching controller that periodically switches the first offset to a value of the second offset and the second offset to a value of the first offset.

20. The resonator fiber-optic gyroscope of claim 19, wherein the frequency switching controller periodically swaps the first sideband resonant modes and the second sideband resonant modes.

* * * * *